US008796874B2

(12) United States Patent  
Hoffmann et al.

(10) Patent No.: US 8,796,874 B2  
(45) Date of Patent: Aug. 5, 2014

(54) METHOD FOR OPERATING A POWER PLANT

(75) Inventors: Jürgen Hoffmann, Untersiggenthal (CH); Thomas Meindl, Kirchdorf (CH)

(73) Assignee: Alstom Technology Ltd, Baden (CH)

( * ) Notice: Subject to any disclaimer, the term of this patent is extended or adjusted under 35 U.S.C. 154(b) by 466 days.

(21) Appl. No.: 12/541,753

(22) Filed: Aug. 14, 2009

(65) Prior Publication Data

US 2010/0032964 A1 Feb. 11, 2010

Related U.S. Application Data (63) Continuation of application No. PCT/EP2008/051617, filed on Feb. 11, 2008.

(30) Foreign Application Priority Data

Feb. 14, 2007 (DE) .......................... 10 2007 007 913

(51) Int. Cl.  
*F01D 15/10* (2006.01)  
*F02C 6/00* (2006.01)

(52) U.S. Cl.  
USPC ............................................................ 290/52

(58) Field of Classification Search  
USPC ........... 290/7, 52; 60/772, 773, 793; 307/151; 363/131  
See application file for complete search history.

(56) References Cited

U.S. PATENT DOCUMENTS 4,219,738 A 8/1980 Griesinger  
4,786,852 A 11/1988 Cook  
5,520,512 A 5/1996 Walker et al.  
5,554,509 A 9/1996 Colucci et al.  
(Continued)

FOREIGN PATENT DOCUMENTS

AU 785125 B2 10/2002  
DE 3140241 A1 4/1983  
(Continued)

OTHER PUBLICATIONS

Offringa, L.L.J. and Duarte, J.L. "A 1600 Kw IGBT Converter With Interphase Transformer for High Speed Gas Turbine Power Plants" Proc. IEEE—IAS Conf. 2000, 4, Oct. 8-12, 2000, Rome, 2000, pp. 2243-2248.

(Continued)

*Primary Examiner* — Julio C. Gonzalez  
(74) *Attorney, Agent, or Firm* — Buchanan Ingersoll & Rooney PC (57) ABSTRACT

A method is provided for operating a power station (10) with turbine shafting (11) including a gas turbine (12) and a generator (18) that is driven directly by the gas turbine (12) and that generates alternating current with an operating frequency. The output of the generator is connected to an electrical grid (21) with a given grid frequency. An electronic decoupling apparatus or variable electronic gearbox (27) is arranged between the generator (18) and the grid (21). The decoupling apparatus decouples the operating frequency from the grid frequency. In the event of a temporary over-frequency or under-frequency event in the electrical grid (21), the mechanical rotational speed of the gas turbine (12) is decreased more than the grid frequency during an under-frequency event of the electrical grid (21) and is increased more than the grid frequency during an over-frequency event of the electrical grid (21).

20 Claims, 9 Drawing Sheets

(56) References Cited

U.S. PATENT DOCUMENTS

| | | | |
|---|---|---|---|
| 5,689,141 A | 11/1997 | Kikkawa et al. | |
| 5,694,026 A | 12/1997 | Blanchet | |
| 6,118,238 A * | 9/2000 | Munro et al. | 318/141 |
| 6,250,877 B1 * | 6/2001 | Westphal et al. | 415/17 |
| 6,519,170 B2 | 2/2003 | Lacaze et al. | |
| 6,628,005 B2 | 9/2003 | Nelson et al. | |
| 6,979,914 B2 | 12/2005 | McKelvey et al. | |
| 7,317,998 B2 | 1/2008 | Lacaze et al. | |
| 7,321,835 B2 | 1/2008 | Lacaze et al. | |
| 7,466,574 B2 | 12/2008 | Lacaze | |
| 2002/0079706 A1 | 6/2002 | Rebsdorf et al. | |
| 2003/0137855 A1 | 7/2003 | Miguchi | |
| 2003/0189339 A1 | 10/2003 | Gupta et al. | |
| 2004/0119293 A1 | 6/2004 | McKelvey et al. | |
| 2004/0222640 A1 | 11/2004 | McKelvey et al. | |
| 2004/0264089 A1 * | 12/2004 | Furuya et al. | 361/92 |
| 2005/0001598 A1 | 1/2005 | Belokon et al. | |
| 2005/0237774 A1 | 10/2005 | Lacaze et al. | |
| 2006/0170219 A1 * | 8/2006 | Larsen | 290/7 |
| 2007/0132249 A1 * | 6/2007 | Andrew et al. | 290/52 |
| 2008/0079400 A1 | 4/2008 | Lacaze | |
| 2008/0315803 A1 * | 12/2008 | Yonemori et al. | 318/148 |
| 2009/0160187 A1 * | 6/2009 | Scholte-Wassink | 290/44 |
| 2011/0001318 A1 * | 1/2011 | Nelson | 290/44 |

FOREIGN PATENT DOCUMENTS

| | | |
|---|---|---|
| DE | 4438186 A1 | 5/1996 |
| DE | 10221594 A1 | 11/2003 |
| DE | 10336659 A1 | 6/2004 |
| DE | 102004016453 A1 | 11/2005 |
| DE | 102004016463 A1 | 11/2005 |
| DE | 102004016464 A1 | 11/2005 |
| EP | 0257385 A1 | 3/1988 |
| EP | 0858153 A1 | 8/1998 |
| EP | 1199794 A1 | 4/2002 |
| EP | 1253388 A | 10/2002 |
| GB | 937717 A | 9/1963 |
| JP | 6277098 A | 4/1987 |
| JP | 10164897 | 6/1998 |
| JP | 2002227660 A | 8/2002 |
| JP | 2003172154 | 6/2003 |
| JP | 2003239763 | 8/2003 |
| JP | 2004208496 | 7/2004 |
| JP | 2005020916 | 1/2005 |
| JP | 2005151769 | 6/2005 |
| JP | 2006029162 | 2/2006 |
| JP | 2006207590 | 8/2006 |
| WO | 2004045058 A1 | 5/2004 |
| WO | 2005047789 A2 | 5/2005 |
| WO | 2005124985 A1 | 12/2005 |
| WO | 2006103159 A1 | 5/2006 |

OTHER PUBLICATIONS

F. Joos et al. "Field Experience With the Sequential Combustion System of the GT24/GT26 Gas Turbine Family" ABB Review No. 5, p. 12-20 (1998)).

* cited by examiner

METHOD FOR OPERATING A POWER PLANT

CROSS REFERENCE TO RELATED APPLICATIONS

This application is a continuation of International Application No. PCT/EP2008/051617, filed Feb. 11, 2008, which claims priority to German Application No. 10 2007 007 913.5 filed Feb. 14, 2007, the entire contents of both of which are incorporated by reference as if fully set forth.

FIELD OF INVENTION

The present invention relates to the field of power plants, specifically, it relates to a method for operating a power plant.

BACKGROUND

Large power stations with outputs in the range of more than 100 MW in which a current-generating generator is driven by a gas turbine and/or steam turbine and feeds the generated electrical output into an electrical grid with given grid frequency (e.g., 50 or 60 Hz) typically have a fixed coupling between the (mechanical or aerodynamic) rotational speed of the turbine and the grid frequency. Here, the output of the generator is connected to the electrical grid in terms of frequency coupling by a connection, while it is driven by the turbine either directly (single-shaft arrangement) or via a mechanical gearbox coupled in terms of rotational speed. Such configurations of power stations are illustrated greatly simplified in FIGS. 2 and 3. By gearboxes, only fixed transmission ratios between the grid frequency and turbine can be realized. However, solutions are also conceivable in which the generator is driven by a power turbine that can be driven with a rotational speed deviating from that of the actual gas turbine.

Figure 1:
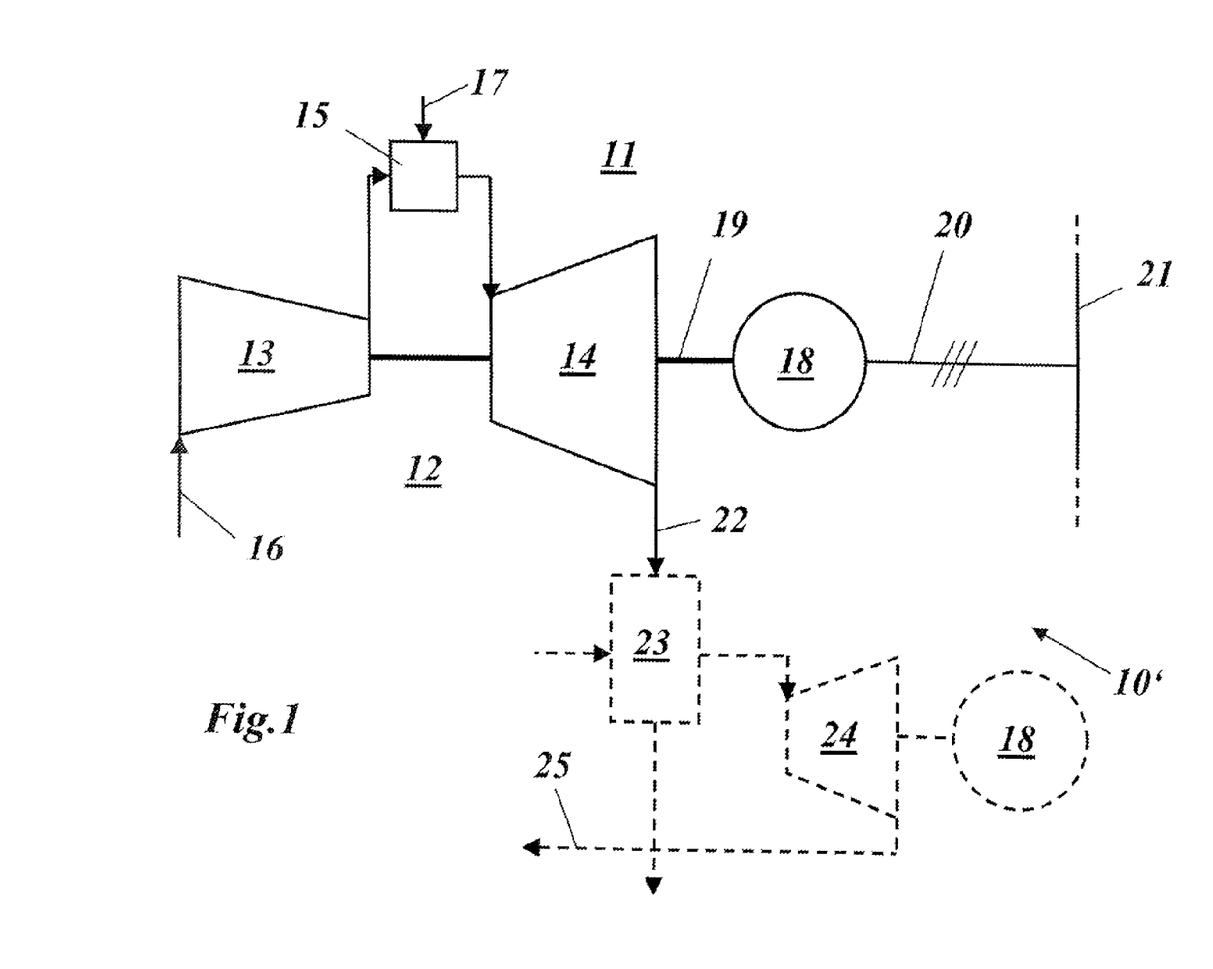
FIG. 1 is a greatly simplified circuit diagram of a power station with a gas turbine and a single-shaft turbine train according to the state of the art.

In a greatly simplified diagram, FIG. 1 shows a power station 10' of known type that generates current by a gas turbine 12 with coupled generator 18 and feeds it to an electrical grid 21. The gas turbine 12 and the generator 18 are connected by a common shaft 19 and form a single-shaft turbine train 11. In the simplest case, the gas turbine comprises a compressor 13 that draws in and compresses combustion air by an air inlet 16. The compressor 13 can be composed of several sub-compressors that are connected one behind the other and that work at increasingly greater pressure levels and optionally allow intermediate cooling of the compressed air. The combustion air compressed in the compressor 13 is led into a combustion chamber 15 into which liquid fuel (e.g., oil) or gaseous fuel (e.g., natural gas) is injected by a fuel feed 17 and combusted under the consumption of combustion air.

The hot gases discharged from the combustion chamber 15 are expanded in a subsequent turbine 14 under work and thereby drive the compressor 13 and the connected generator 18. The exhaust gas that is still relatively hot at the outlet of the turbine can also be sent through a subsequent heat recovery steam generator 23, in order to generate, in a separate water-steam circuit 25, steam for the operation of a steam turbine 24. Such a combination is designated as a combined cycle power station. The steam turbine 24 here can be coupled with the generator 18 on the side opposite the turbine 14. However, it can also drive a separate generator.

In the single-shaft arrangement of FIG. 1, the rotational speed of the gas turbine 12 is at a fixed ratio to the frequency of the alternating voltage that is generated in the generator 18 and that must be equal to the grid frequency of the electrical grid 21. For large gas-turbine units that are typical today with outputs of greater than 100 MW, a rotational speed of the gas turbine of 3600 rpm (e.g., gas turbine Model GT24 of the assignee of the present application) is allocated to the generator frequency or grid frequency of 60 Hz and a rotational speed of 3000 rpm (e.g., gas turbine Model GT26 of the assignee of the present application) is allocated to the generator frequency of 50 Hz.

Figure 2:
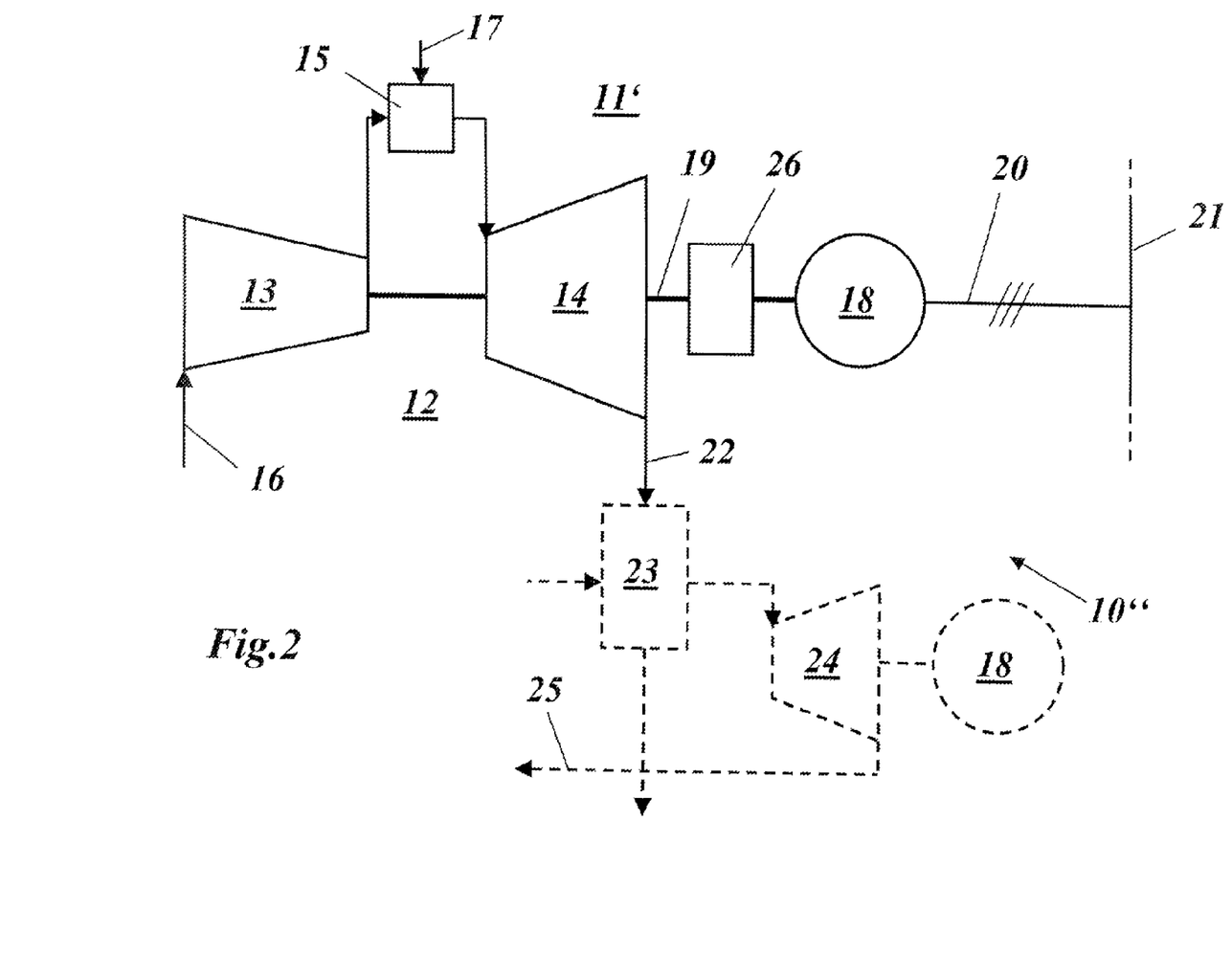
FIG. 2 is a greatly simplified circuit diagram of a power station with a gas turbine and a mechanical gearbox according to the state of the art.

If a different ratio is to be achieved between the rotational speed of the gas turbine 12 and the generator or grid frequency, then a mechanical gearbox 26 that is typically embodied as a reducing gearbox and thus allows higher rotational speeds and smaller constructions of the gas turbine 12 can be inserted according to FIG. 2 in a power station 10" in principle between the shaft 19 of the gas turbine 12 and the generator 18 (turbine shafting 11'). Such mechanical gearboxes 26, however, can be used only for outputs up to approximately 130 MW for reasons of stability. On the other hand, large outputs for each gas turbine of more than 100 MW and high degrees of efficiency are achieved, above all, with relatively low-speed single-shaft machines.

The following disadvantages result from the rigid coupling between the turbine rotational speed and the grid frequency:
A stable operation on the electrical grid is possible only to a limited extent.
It leads to output drop-offs in the turbine or to thermal and mechanical loading in the dynamic control for grid-frequency support by raising the gas-turbine inlet temperature.
Grid frequency-independent or load-independent output control of the power station is not possible.
Grid frequency-independent or load-independent efficiency optimization of the power station is not possible.
Grid frequency-independent or load-independent partial-load optimization of the power station is not possible.
Emissions control of the gas turbine is possible only to a limited extent.
Conventionally, in the event of an under-frequency, the power station first loses output; only after equalization of the insufficient output through corresponding readjustment can the power station actively support the electrical grid through excess output. Conversely, in the event of an over-frequency, the power station first increases output; only after equalization of the excess output through corresponding readjustment can the power station actively support the electrical grid through output reduction.
Transients are produced for fluctuations in frequency:
  In the event of an under-frequency, as the first step, the intake mass flow is reduced; this leads (at first for constant fuel mass flow) to over-firing and usually shortly thereafter to under-firing due to corrective action.
  Analogously, in the event of an over-frequency, there is under-firing followed by over-firing.
  These transients lead to reduced service life and increased emissions (NOx in the event of over-firing and CO in the event of under-firing).
In the case of a (temporary) over-frequency or under-frequency event in the electrical grid, the shafting in the power station is very strongly accelerated or braked. In the event of this acceleration, a large quantity of energy is stored or released. With this energy absorption or release, the power station at first supports the grid frequency through the moment of inertia of the shaft.

From U.S. Pat. No. 5,694,026, a single-shaft turbine generator set without a step-down gear is known, in which a static frequency converter is arranged between the output of the generator and the electrical grid, wherein, with the help of this frequency converter, the alternating-voltage frequency generated by the generator is converted to the frequency of the electrical grid. When the gas turbine is started, the generator is used as a motor that is supplied with energy from the electrical grid via the static frequency converter.

From U.S. Pat. No. 6,979,914, a power station with a single-shaft arrangement from a gas turbine and generator is known in which a converter is similarly provided between the generator output and the electrical grid, in order to adapt the alternating voltage generated by the generator to the grid frequency.

From the article by L. J. J Offring a, et al. "A 1600 kW IGBT Converter With Interphase Transformer For High Speed Gas Turbine Power Plants," Proc. IEEE-IAS Conf. 2000. 4, 8-12 Oct. 2000, Rome, 2000, pp. 2243-2248, a power station with a high speed gas turbine (18,000 rpm) and comparatively smaller output power (1600 kW) is known, in which frequency decoupling between the generator and electrical grid is realized by a converter.

Special control and operating concepts for supporting the grid frequency in the case of temporary over-frequency or under-frequency events ("Fast Frequency Support"), however, are not to be taken from these publications

SUMMARY

The present disclosure is directed to a method for operating a power station having a turbine shafting. The power station including a gas turbine and a generator that is driven directly by the gas turbine and that generates alternating current at an operating frequency, whose output is connected to an electrical grid with a given grid frequency. An electronic decoupling apparatus is arranged between the generator and the grid. The decoupling apparatus decouples the operating frequency from the grid frequency. The method includes adjusting a mechanical rotational speed of the gas turbine in a controlled way temporary in the event of over-frequency or under-frequency events in the electrical grid.

BRIEF DESCRIPTION OF THE DRAWINGS

The invention shall be explained in greater detail below with reference to embodiments in connection with the drawings in which.

DETAILED DESCRIPTION OF THE PREFERRED EMBODIMENTS

Introduction to the Embodiments

The objective of the disclosure is to provide a method for operating a frequency-decoupled power station that allows a fast response to over-frequency and under-frequency events in the electrical grid thereby largely preventing transients in the power station.

According to the disclosure, during temporary over-frequency or under-frequency events in the electrical grid, the mechanical rotational speed of the gas turbine can be controlled independent of the grid frequency. In the event of an under-frequency in the electrical grid, the rotational speed of the gas turbine can be decreased to a greater or lesser degree than the grid frequency and, in the event of an over-frequency in the electrical grid, it can be raised to a greater or lesser degree than the grid frequency. Here, the frequency support is increased by releasing or absorbing rotational energy from the shafting of the gas turbine. Changes in the grid frequency are here understood to be changes in the grid frequency produced within a few seconds or a few tens of seconds, like those generated, for example, by the tripping of a power station or by the connection of a large load. In this context, temporary changes are usually understood as time periods of a few seconds up to approximately 30 s. However, these could also last up to several minutes and could appear in stages, if, for example, first a power station is disconnected and then, with a delay, a second power station is disconnected due to the reduced grid frequency. These stand opposite longer-lasting changes in the grid frequency in which the grid frequency is operated over a longer time period at a reduced frequency. Longer-lasting changes are usually understood to be time periods of greater than 30 s. However, these could also last up to several minutes, in special cases even up to hours. Here, temporary grid frequency changes can be followed by longer-lasting changes in the grid frequency.

According to one configuration, the decrease or increase in the rotational speed of the gas turbine is performed in a controlled way. Because the decrease in rotational speed is performed in a controlled way, suitable advance control can minimize transient overshoots and undershoots in the hot-gas temperature.

According to another configuration, a gas turbine is used with an output greater than 100 MW and, as the electronic decoupling apparatus, a frequency converter in the form of a matrix converter is used.

A different configuration distinguishes itself in that the operating frequency clearly differs from the grid frequency or second operating frequency, wherein, in particular, the grid frequency or the operating frequency equals 50 Hz or 60 Hz. In general, for this configuration, deviations of more than 5% are understood as a clear differentiation between the grid frequency and operating frequency. For the use of 50 Hz gas turbines in 60 Hz electrical grids and vice versa, differences on the order of magnitude of 20% are to be expected. For the use of slow-moving heavy machinery, the deviation can also be significantly greater than 100%.

Preferably, a gas turbine with sequential combustion is also used as the gas turbine.

Furthermore, it is advantageous when the matrix converter that is used comprises a plurality of controllable, bidirectional switches that are arranged in an (m×n) matrix and that, controlled by a closed-loop control system, connect m inputs selectively with n outputs, wherein m is greater than n, and wherein a first device is provided for determining the sign of the currents in the inputs and a second device is provided for determining the sign of the voltages between the inputs, and wherein the first and second devices are in active connection with the closed-loop control system. Bidirectional switches can be comprised of one component but can also be constructed from several components. For example, two back-to-back parallel-connected thyristors with opposite switch-through directions could be used as controllable, bidirectional switches. The devices for determining the sign of currents and voltages can be, for example, current or voltage meters. Alternatively, e.g., binary transmitters that output only the polarity could be used.

DETAILED DESCRIPTION

Figure 3:
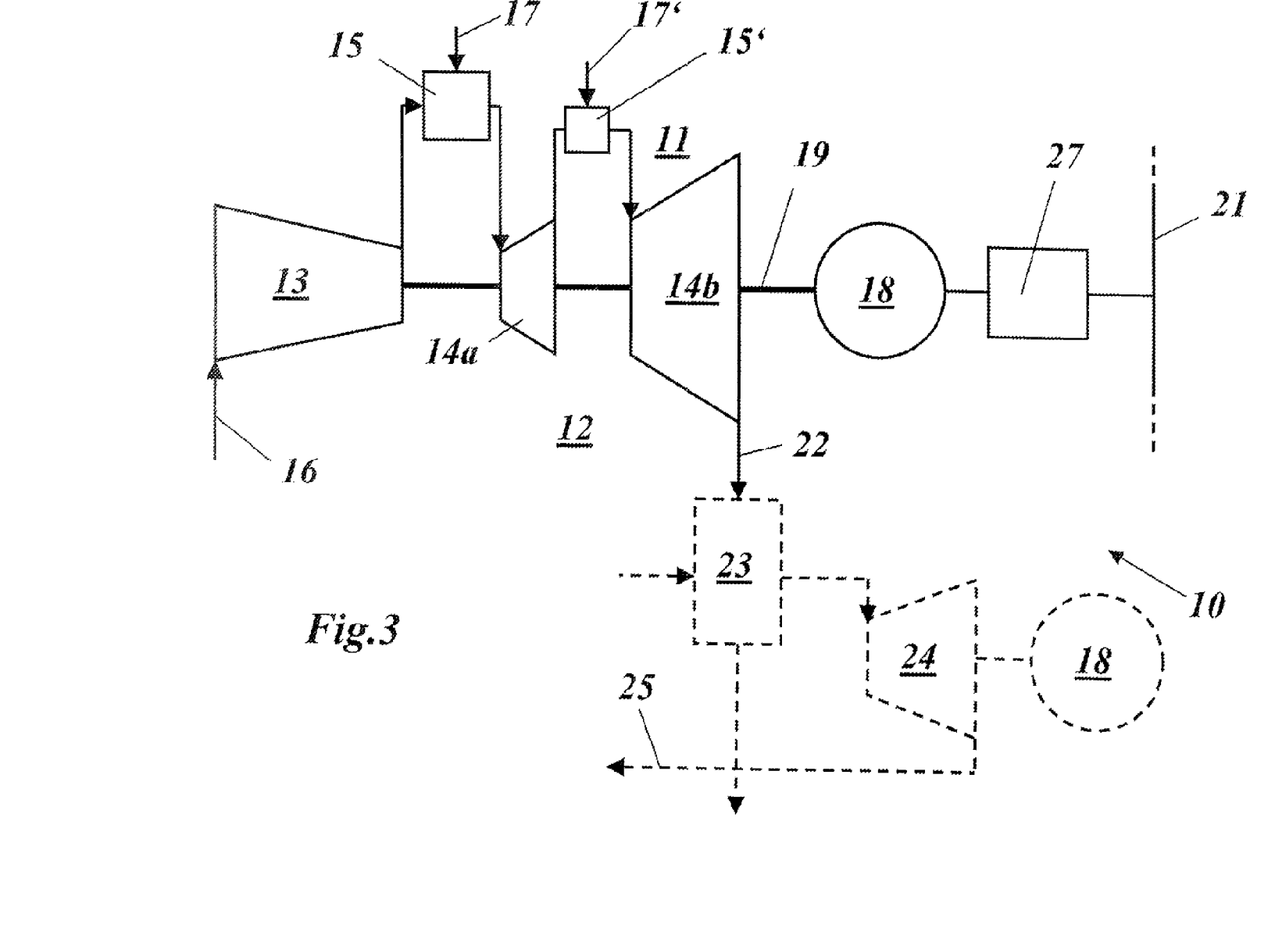
FIG. 3 is a greatly simplified circuit diagram of a power station with a gas turbine and an electronic decoupling apparatus or variable electronic gearbox.

In a greatly simplified circuit diagram, FIG. 3 illustrates a power station with a gas turbine and an electronic decoupling apparatus, like that which is suitable for executing the method according to the disclosure. The power station 10 comprises a gas turbine 12 with a compressor 13 and sequential combustion, in which a first combustion chamber 15 with a first fuel via a first fuel supply 17 generates hot gas that is expanded in a first turbine 14a and that is then led into a second combustion chamber 15', where it causes, with a second fuel via a second fuel supply 17', intermediate heating of the hot gas that is then expanded in the second turbine 14b. Instead of the sequential combustion that is especially favorable in terms of efficiency, however, one-stage combustion could also be provided. The remaining parts of the station correspond to the parts with the same reference symbols in FIG. 1 or 2.

The generator 18 is directly coupled to the shaft 19 of the gas turbine 12. Thus, the generator 18 rotates at the same rotational speed as the gas turbine 12. Now, however, between the output of the generator 18 and the electrical grid 21 there is an electronic decoupling apparatus 27 that causes a decoupling of the operating frequency generated in the generator 18 or the rotational speed of the gas turbine 12 from the given grid frequency of the electrical grid.

Figure 4:
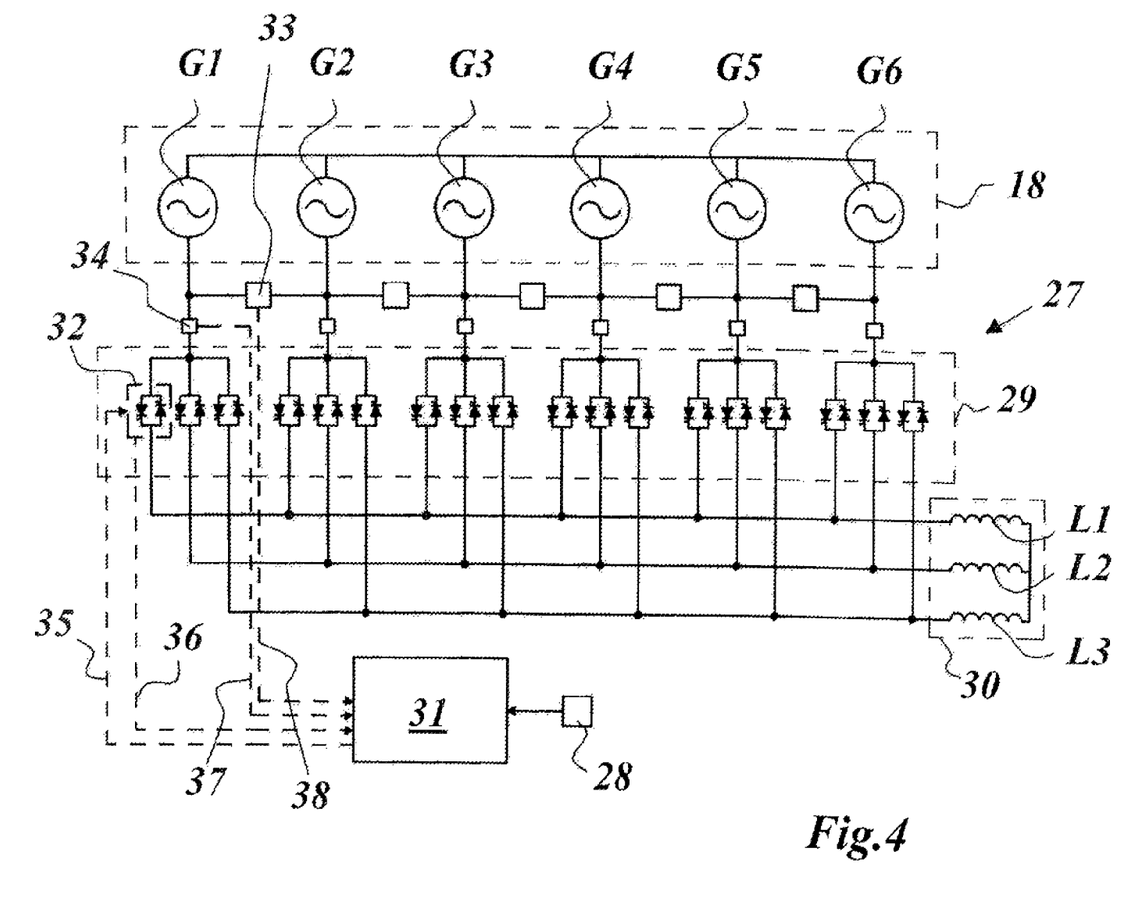
FIG. 4 shows an example inner configuration of a matrix converter, as it can be used as an electronic decoupling apparatus or variable electronic gearbox in a system according to FIG. 3.

The electronic decoupling apparatus 27 is advantageously formed as a matrix converter without a direct-current intermediate circuit—in order to limit the dissipation power. The configuration and function of such a matrix converter that features an especially low-loss operation due to its control has been described in EP-A2-1 199 794. Additional configurations for such a matrix converter have been made in EP-A1-1 561 273, DE-A1-10 2004 016 453, DE-A1-10 2004 016 463, and DE-A1-10 2004 016 464. In FIG. 4, the basic circuit diagram of a matrix converter is shown with six input phases and three output phases. The matrix converter (27) connects, in a time sequence, six phases G1, . . . , G6 of a generator 18 as a source with three phases L1, . . . , L3 of a load 30. The power section 29 required for this purpose comprises 18 bidirectional switches 32 in the form of back-to-back parallel-connected switched thyristors (in the general case, there are m×n switches for m input/source phases and n output/load phases). The switches 32 are arranged in a (6×3) matrix. For the control of the switches 32, a control circuit or controller 31 is provided that receives time signals (a clock frequency) from a timer 28. The switching state of the switches 32 (ON, OFF) is monitored and reported via a first signal line 36 to the controller 31. The switches 32 are each controlled by the controller 31 via control line 35.

In each of the individual phases G1, . . . , G6 of the generator 18, a current measurement device 34 is arranged that reports the sign of the phase current via a second signal line 37 to the controller 31. Furthermore, between the phases G1, . . . , G6 of the generator 18 there are voltage measurement devices 33 that report the sign of the corresponding phase differential voltage via a third signal line 38 to the controller 31. For the details of the operating sequence of the matrix converter, refer to the publications named above.

With the decoupling apparatus 27, in particular, in the form of a matrix converter of the described type, the following advantages of electronic decoupling are produced:

Support of the grid frequency of the electrical grid 21 is possible in a wide grid frequency range. While, for rigid frequency coupling, grid frequency support in the range of 5-6% of the grid frequency can be achieved, through electronic decoupling, support in the range of up to 20% can be achieved.

Adaptation to optimum operating values (output, efficiency) is possible as a function of environmental conditions (e.g., inlet temperature).

The output can be increased.

The efficiency can be improved.

Flexibility in the event of load fluctuations and the service life of the turbine can be improved.

The turbine can be run, furthermore at a constant rotational speed. Previous additional thermal or mechanical loads that were necessary due to measures for supporting the rotational speed are eliminated.

The emission values can be improved. The additional degree of freedom of a variable rotational speed allows a desired output to be started at a higher or lower rotational speed. Associated with this are lower or higher turbine inlet temperatures with the effect of influencing the emissions of $CO_2$ and NOx. In particular, increased emissions in the event of frequency support can be avoided.

The primary possibility of being able to operate, according to the disclosure, turbine shafting—turbine and generator—within a power station independent of the grid frequency with stability at a desired (designed) rotational speed supports the stabilization of power grids. In the event of frequency drop-offs, the power station must be in the position to maintain the power output at a normal grid frequency or, ideally, even to output an increased power to the power grid. Previous power station systems could guarantee this only to a limited degree. A system coupled rigidly with the grid frequency perceives the grid frequency reduction as an undesired rotational-speed reduction on the turbine and the generator. Here, the output power decreases for otherwise equal operating parameters. In this case, a gas turbine system reacts with a significantly increased fuel supply that leads to an increased hot-gas temperature within the turbine. This considerably reduces, in turn, the service life of the turbine, which increases the operating costs of the station. Pollutant emissions, in the form of NOx, also increase significantly in this operating phase. Thus, two limits have already been defined that greatly limit a power increase in the event of a grid frequency drop—service life and emissions. As a third aspect, the mechanical compatibility plays a role. Large frequency drops greater than 6% lead to the shutdown of power stations, because the stations are not in the position mechanically to be able to be operated at correspondingly reduced rotational speeds.

In the event of a grid frequency decoupled system, all of the disadvantages named above are eliminated. There is no limitation with respect to minimum permissible frequency fluctuations, because the turbine shafting notices no pronounced fluctuation in rotational speed. Consequently, there are no increases in pollutants and no reduction in service life.

Another positive aspect of a grid frequency independent power station system is the better ability to adapt a station to different site conditions. The already mentioned grid stability is an essential aspect that depends decisively on the site. In addition to this are, above all, different environmental conditions, such as outside temperatures, air pressure, in particular, the air pressure caused by the installation elevation, air humidity, and also fuel composition, which influence the operating state of a power station. The additional degree of freedom of the grid frequency-independent rotational speed control allows it to generate optimized operating conditions corresponding to the current environmental conditions. Here, both efficiency improvements and also power increases are possible.

As already mentioned above, through the rotational speed-related decoupling of the gas turbine from the grid frequency or the operating frequency of a connected load, an improved operation of the gas turbine is possible: The gas turbine is operated in all of the operating ranges independent of the grid frequency or operating frequency of the load as close as possible to the designed aerodynamic rotational speed value, in order to optimize the performance, that is, efficiency and output.

Figure 5:
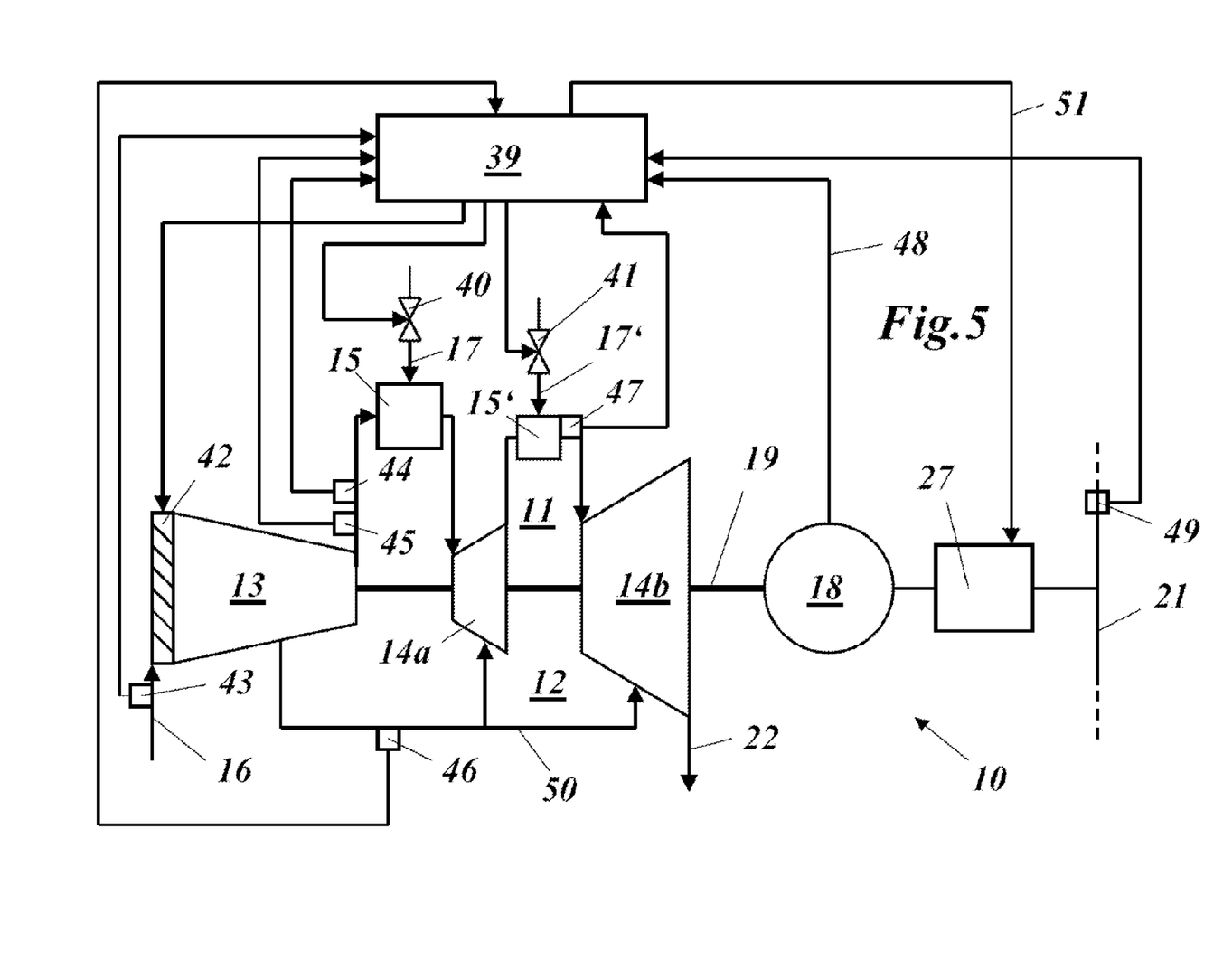
FIG. 5 depicts a system comparable to FIG. 4 of devices for executing the method of the present disclosure.

In FIG. 5, a simplified schematic of a power station 10 is illustrated that is designed for an operating method according to the disclosure. The turbine shafting 11 with the gas turbine 12 and the generator 18 corresponds to that in FIG. 4. This also applies to the electronic decoupling apparatus 27 and the connected electrical grid 21. The electric grid 21 could be a general power supply grid, but could also be a railway power supply grid. The illustration of a possible, additional steam turbine with corresponding water/steam circuit has been eliminated here for reasons of space.

For the regulation or control of the gas turbine 12, a series of adjustable compressor guide vanes 42 is used at the input of the compressor, as well as control valves 40 and 41 in the fuel supply 17 and 17' to the combustion chambers 15, 15', respectively. The corresponding control signals come from a controller or closed-loop control system 39 according to the magnitudes of certain input parameters that can be used individually or in selectable combination. One possible parameter is the compressor inlet temperature that is measured with a first transducer 43 arranged at the air inlet 16. Other possible parameters are the compressor end temperature and the compressor end pressure that are measured with second and third transducers 44 and 45, respectively, at the output of the compressor. Another transducer 46 that is arranged at a cooling air supply 50 from the compressor 13 to thermally loaded components of the gas turbine 12, e.g., into the two turbines 14a and 14b, measures the pressure and/or the temperature and/or the throughput of the cooling air. Another transducer 47 can be arranged at the second combustion chamber 15', in order to measure the pressure in this combustion chamber. The rotational speed of the gas turbine 12 can be sensed, for example, on the generator 18 and input via a measurement line 48 into the closed-loop control system 39. A grid frequency sensor 49 can also be provided for the measurement of the grid frequency in the electrical grid 21.

The closed-loop control system 39 can then control the aerodynamic or mechanical rotational speed of the gas turbine 12 to a constant value, without the rotational speed being influenced in another way by the grid frequency F of the electrical grid 21.

The control of the gas-turbine rotational speed can be performed with complete decoupling of the gas turbine 12 from the electrical grid 21 at the gas turbine 12 by corresponding parameters, such as fuel mass flow and position of the compressor inlet row. Alternatively, the control of the rotational speed can also take place, for example, such that the target rotational speed 51 calculated in the closed-loop control system 39 of the gas turbine is transmitted to the controller 31 of the decoupling apparatus 27 and the rotational speed is imposed on the gas turbine 12 via the generator. The generator 18 is here supported via the decoupling apparatus 27 against the electrical grid 21 that is quasi-static in comparison with the gas turbine 12 and imposes the rotational speed $n_{mech}$ through the control of the frequency relationship between the grid frequency F and the mechanical rotational speed $n_{mech}$ of the gas turbine. In this case, the decoupling apparatus 27 works as a variable gearbox with controlled step-up ratio between the mechanical rotational speed of the gas turbine $n_{mech}$ and grid frequency F.

In the case of a temporary over-frequency or under-frequency event in the electrical grid 21, to a large degree the mechanical rotational speed is not held constant, but instead the system is driven as follows:

In the event of an under-frequency event, by the frequency conversion, the rotational speed of the shafting made from the gas turbine 12 and the generator 18 is decreased more than the grid frequency. Through the stronger reduction of the mechanical rotational speed, the frequency support is increased through the release of rotational energy. In this case, because the rotational speed reduction takes place in a controlled way, suitable advance control can minimize transient overshoots and undershoots in the hot-gas temperature.

Analogously, in the event of an over-frequency event of the electrical grid 21, the mechanical rotational speed of the gas turbine 12 can be increased more than the grid frequency. Through the greater increase of the mechanical rotational speed, the frequency support is increased through the absorption of rotational energy in the shafting. In this case, suitable advance control can also minimize transient overshoots and undershoots in the hot-gas temperature The course of grid frequency events as well as the possible influence due to electrical decoupling in the course of such events is described as examples in FIG. 6 to FIG. 10 with reference to under-frequency events. They are described for a 50 Hz electrical grid 21, but can also be used analogously for a 60 Hz electrical grid 21 or an electrical grid 21 with other design frequencies. The corresponding concepts for over-frequency events are also disclosed here for someone skilled in the art through analogy. Interference signals, small high-frequency variations of the grid frequency F or noise is negligible and not shown.

The influence of small high-frequency variations in the grid frequency F or noise on the closed-loop control system can be suppressed by a dead zone. This means that the system reacts to changes in frequency only after a limiting value has been exceeded.

Because it is possible that the grid frequency will slowly wander out of the dead zone, but this slow frequency shift should not be answered with fast load changes in the gas turbine, the closed-loop control system can work with the frequency deviation relative to a sliding average of the grid frequency plus a dead zone surrounding this average. A dead zone and sliding average, also called averaged supply grid frequency, are clearly described in EP0858153 for conventional gas turbines 12 without electrical decoupling from the electrical grid 21 and gas turbine 12. EP0858153 and its application to gas turbines 12 with electronic decoupling to the electrical grid 21 are a component of this application.

Figure 6:
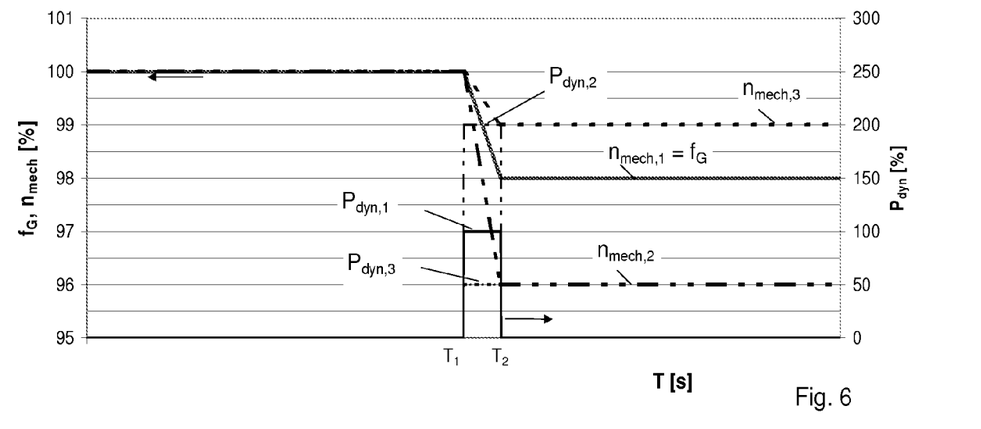
FIG. 6 shows the relationship between the change in grid frequency and change in gas turbine rotational speed on an under-frequency event.
Figure 7:
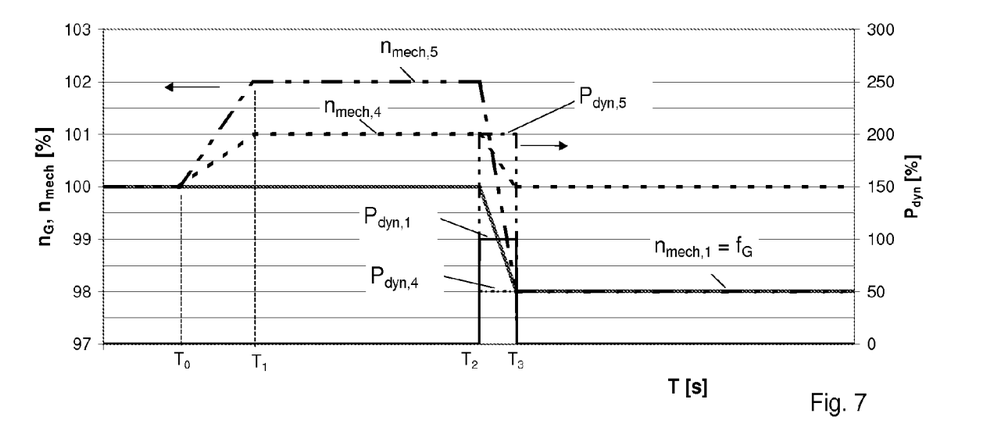
FIG. 7 shows the relationship between the change in grid frequency and change in gas turbine rotational speed on an anticipated under-frequency event.

In FIGS. 6 and 7, the dynamic power $P_{dyn}$ that is output during changes in rotational speed of the shafting of a gas turbine 12 is discussed with reference to ideal examples.

In FIG. 6, the profile of the gas turbine rotational speed $n_{mech}$ as well as the dynamic power $P_{dyn}$ output by the gas turbine shafting to the electrical grid during an under-frequency event are shown schematically. In the example, the grid frequency F decreases with a constant slope between the times $T_2$ and $T_3$ from 50 Hz to 49 Hz. Due to the change in the kinetic rotational energy of the shafting, when there is a change in the rotational speed, dynamic power $P_{dyn}$ is output that is proportional to the slope of the change in the rotational speed. The influence of the relationship between the grid frequency change and the change in the gas turbine rotational speed in an under-frequency event for a given change in the grid frequency that is here shown as the normalized grid frequency $f_G$ will be explained with reference to three ratios. In the starting case, the mechanical rotational speed $n_{mech,1}$ of the gas turbine shafting is changed in the ratio 1:1 with the grid frequency F, as is necessarily the case also for a fixed mechanical coupling. Accordingly, during the change in rotational speed, a normalized dynamic power $P_{dyn,1}$ is output. This is proportional to the slope of the change in rotational speed and to the rotational speed, wherein here, for simplification, only the dependency on the rotational speed slope is shown.

In the second case, the rotational speed is reduced more than the grid frequency $f_G$ with a ratio of 2:1. Accordingly, twice the dynamic power $P_{dyn,2}$ can be output. For this, however, double the reduction in the mechanical rotational speed $n_{mech,3}$ must be taken into account.

In the third case, the rotational speed is reduced less than the grid frequency $f_G$ with a ratio of 1:2. Accordingly, only half the dynamic power $P_{dyn,3}$ can be output. Therefore, the mechanical rotational speed $n_{mech,3}$ is reduced only half as much.

In FIG. 7, the influence of the ratio between the change in grid frequency and the change in the gas turbine rotational speed with electronic decoupling for an anticipated under-frequency event is shown schematically. For comparison, the first case is shown again in which the change in rotational speed of the shafting $n_{mech,1}$ follows the change in the normalized grid frequency $f_G$ exactly and thus leads to the output of the dynamic power $P_{dyn,1}$ during the transients between the time $T_2$ and $T_3$. In this example, the operator is informed of an imminent event, such as, for example, the disconnection of a large power station from the electrical grid or the connection of a large load to the electrical grid, which could result in a frequency drop-off. The operator selects an operating mode of the gas turbine accordingly at the time instance $T_0$. In preparation for the under-frequency event, the mechanical rotational speed $n_{mech}$ of the gas turbine is now increased and reaches an increased mechanical rotational speed $n_{mech}$. Accordingly, dynamic power $P_{dyn}$ is absorbed from the shafting (not shown).

In the first example for an anticipated under-frequency event, the mechanical rotational speed $n_{mech,4}$ of the gas turbine 12 is first increased by 1% between $T_0$ and $T_1$. In addition, during the grid frequency drop-off between $T_2$ and $T_3$, the rotational speed $n_{mech,4}$ of the gas turbine shafting is decreased less than the grid frequency $f_G$ at a ratio of 1:2. Accordingly, only half the dynamic power $P_{dyn,4}$ can be output. The mechanical rotational speed $n_{mech,4}$ is therefore reduced only half as much and at the end of the grid frequency drop-off, the gas turbine 12 is still running at the designed rotational speed.

In a second example for an anticipated under-frequency event, the mechanical rotational speed $n_{mech,5}$ of the gas turbine is first increased by 2% between $T_0$ and $T_1$. In addition, during the grid-frequency drop-off between $T_2$ and $T_3$, the rotational speed of the gas turbine shafting is reduced more than the grid frequency $f_G$ with a ratio of 2:1. Accordingly, twice the dynamic power $P_{dyn,5}$ can be output. Therefore, the mechanical rotational speed $n_{mech,5}$ is also reduced twice as much. Due to the increased rotational speed before the grid frequency drop-off, however, at the end of the grid frequency drop-off, the gas turbine is still running with the same rotational speed $n_{mech}$, as in the reference case with the fixed coupling between the electrical grid 21 and the gas turbine 12.

Figure 8:
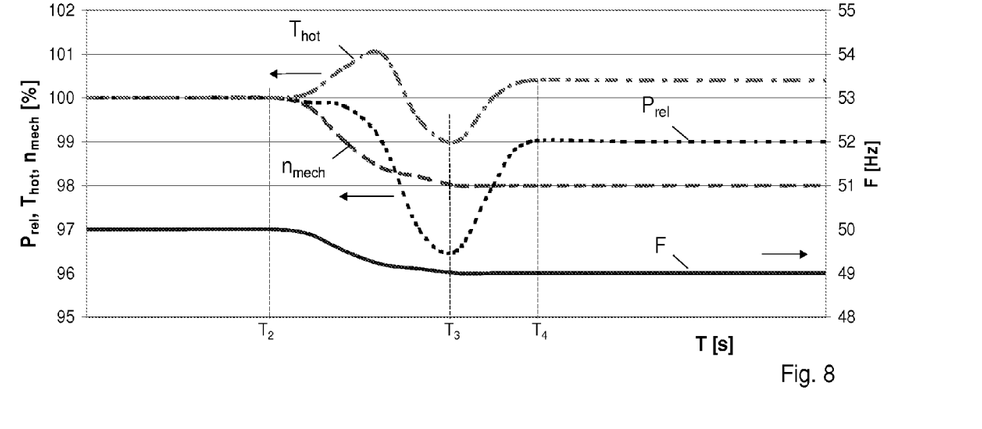
FIG. 8 shows an under-frequency event for fixed coupling.
Figure 8A:
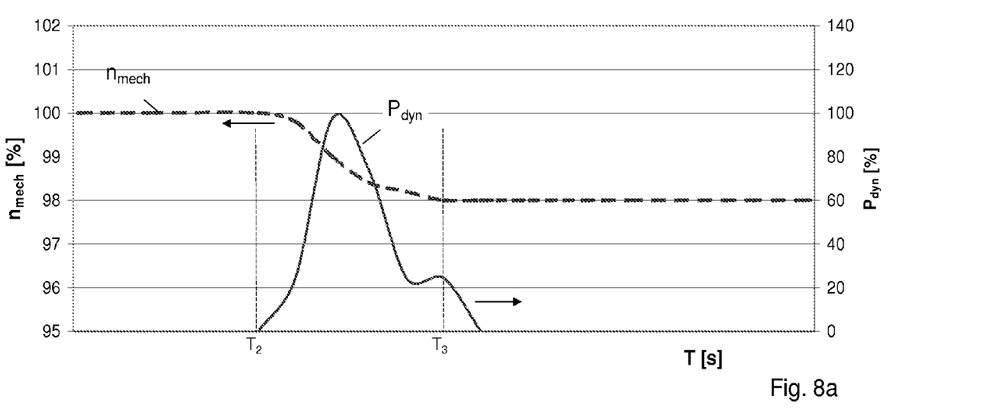
FIG. 8a shows a profile of the gas turbine rotational speed and dynamic output in the event of an under-frequency event and fixed coupling.
Figure 8B:
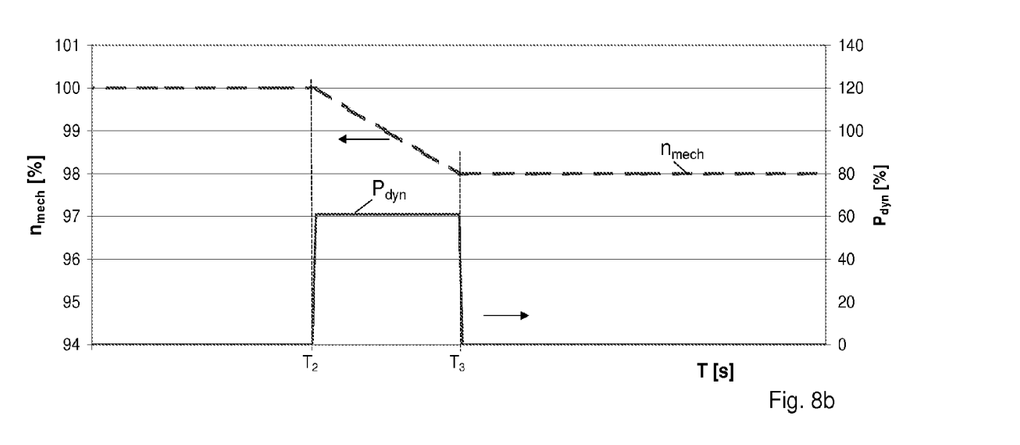
FIG. 8b shows a profile of the gas turbine rotational speed and dynamic output in the event of an under-frequency event with electronic decoupling and controlled rotational-speed gradient
Figure 9:
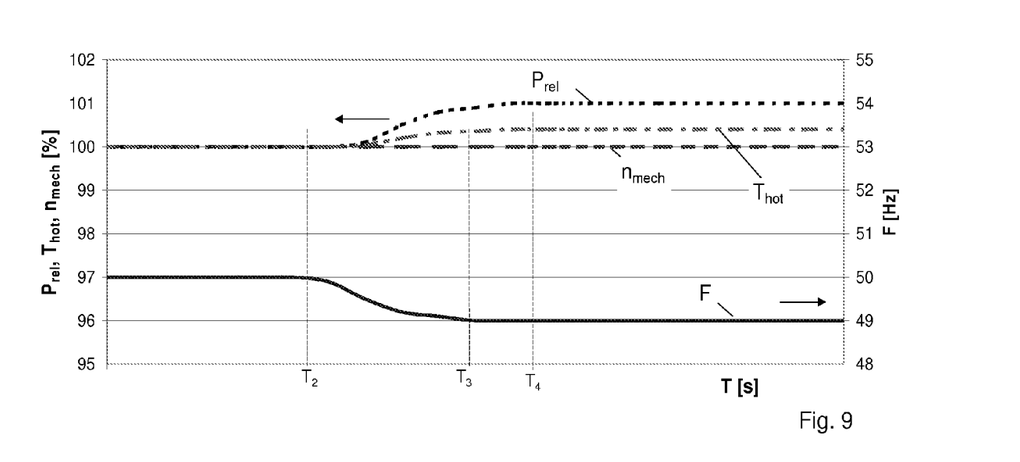
FIG. 9 shows an under-frequency event with electronic decoupling and constant gas-turbine rotational speed.
Figure 10:
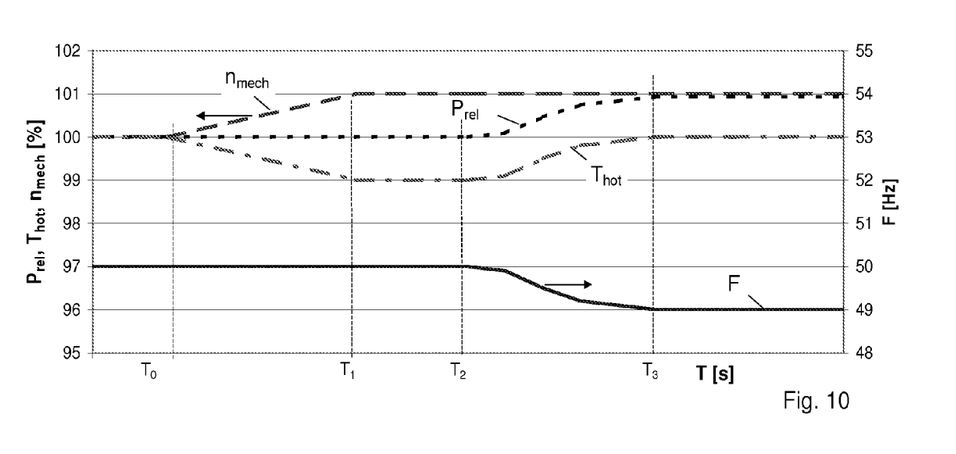
FIG. 10 shows an under-frequency event with electronic decoupling and anticipated under-frequency event.

In FIGS. 8, 9, and 10, the dynamic power $P_{dyn}$ discussed above is neglected and the most important processing parameters and also the quasi-stationary power $P_{rel}$ of the gas turbine 12 is shown. Here, the quasi-stationary power is understood to be the power that the gas turbine 12 would output in steady operation due to the thermal initial conditions at the corresponding rotational speed. The profile of the dynamic power $P_{dyn}$ will be discussed as an example with reference to FIGS. 8a and 8b.

In FIG. 8 an example is first shown schematically for an under-frequency event with fixed coupling between the gas turbine 12 and electrical grid 21. Starting with the full-load operation, between the times $T_2$ and $T_3$ a frequency drop-off occurs in which the grid frequency F drops from 50 Hz to 49 Hz. Accordingly, the mechanical rotational speed $n_{mech}$ falls from 100% to 98%. The intake mass flow of the gas turbine 12 (not shown) drops proportional to the rotational speed, which leads to an increase of the hot gas temperature $T_{hot}$ for an initially constant fuel mass flow (also now shown). Due to the reduced intake mass flow, the gas turbine power $P_{rel}$ falls. Here, the power losses are at first small due to the rise in the hot gas temperature $T_{hot}$. With a time delay, the closed-loop control system 39 of the gas turbine 12 attempts to counteract the rapid rise in the hot gas temperature $T_{hot}$. In reality, according to the transient profile of the under-frequency event, the speed of the measurement chains, and the time constants of the closed-loop control system 39, this leads to an undershooting of the hot gas temperature $T_{hot}$. The minimum hot gas temperature $T_{hot}$ is reached in this example at the time instance $T_3$. At this time instance, the grid frequency F also stabilizes at 49 Hz. Corresponding to the low mechanical rotational speed $n_{mech}$ and the low hot-gas temperature $T_{hot}$ at the time instance $T_3$, the gas turbine power $P_{rel}$ experiences a considerable drop-off. Only after a delay, at time $T_4$ does the controller bring the hot gas temperature $T_{hot}$ to the desired value raised relative to the design value for the frequency support. In the example, the minimum in the hot gas temperature $T_{hot}$ is reached purely by chance at the time $T_3$.

In FIG. 8a the profile of the gas turbine rotational speed $n_{mech}$ of the example of an under-frequency event with fixed coupling between the gas turbine 12 and electrical grid 21 from FIG. 8 is again shown. In addition, the associated normalized dynamic power $P_{dyn}$ is shown schematically versus time. According to the profile of the change in frequency, a maximum in the dynamic power $P_{dyn}$ is given at the time of the steepest slope in the rotational speed. The shown normalized dynamic power $P_{dyn}$ is normalized with this maximum value.

According to the under-frequency event and the moment of inertia of the shafting, this maximum could reach the order of magnitude of the full-load power of the gas turbine 12. The power station, in particular, the shafting of the gas turbine 12 and the electrical systems, is to be designed accordingly.

Due to the electrical decoupling, it is possible to avoid such maximums in the dynamic power $P_{dyn}$. In comparison, in FIG. 8b it is shown how, with a constant slope in the mechanical rotational speed $n_{mech}$, the same kinetic energy is output in the time span between $T_2$ and $T_3$ as in the example of FIG. 8a. However, the dynamic power $P_{dyn}$ is limited to 60% of the maximum value of the example of FIG. 8a. Accordingly, a power station could be designed with decoupling and regulated or limited rotational speed slope at lower maximum values. For operation at constant gas turbine rotational speed $n_{mech}$ independent of the electrical grid 21, the design for the dynamic power $P_{dyn}$ can be completely eliminated.

For the selection of a driving concept in which the rotational speed $n_{mech}$ of the gas turbine 12 is regulated and driven decoupled from the electrical grid 21, the closed-loop control system can pre-calculate approximately changes in the intake mass flow and the initial conditions of the combustion chambers 15, 15' and can perform, accordingly, advance control of the control valves 40, 41. In this way, the transient behavior can be improved and maximum values in the hot gas temperature can be avoided or reduced.

In FIG. 9, analogous to FIG. 8, the same under-frequency event is shown schematically with electronic decoupling and constant gas-turbine rotational speed. The mechanical rotational speed of the gas turbine $n_{mech}$ remains constant independent of the grid frequency F. Accordingly, a direct influence of the grid frequency F on the hot gas temperature $T_{hot}$ and the gas turbine power $P_{rel}$ at the time $T_2$ is also not to be seen. Only after a short delay does the closed-loop control system raise the hot gas temperature $T_{hot}$, in order to increase the gas turbine power $P_{rel}$ for frequency support. The grid frequency F stabilizes at the time instance $T_3$ at 49 Hz. Due to the inertia of the gas turbine 12, the measurements, and the closed-loop control system 39, the gas turbine 12 comes to a quasi-stationary operation with constant power $P_{rel}$ and hot gas temperature $T_{hot}$ only after a small time delay at time instance $T_4$.

As another example, in FIG. 10, an under-frequency event is shown schematically with electronic decoupling, anticipated under-frequency event, and a gas turbine rotational speed $n_{mech}$ that is held constant during the frequency drop-off. In this example, the operator is informed of an imminent event, like, for example, the disconnection of a large power station from the electrical grid 21 or the connection of a large load to the electrical grid 21, which could result in a frequency drop-off. Accordingly, at the time instance $T_0$ the operator selects an operating mode for the gas turbine 12. Now, for preparing for the under-frequency event, the mechanical rotational speed $n_{mech}$ of the gas turbine increases and reaches, at the time instance $T_1$, for example, 101%. In order to keep the load $P_{rel}$ constant at the designed full load, the hot gas temperature $T_{hot}$ is reduced according to the increased rotational speed $n_{mech}$. Here, with respect to operation at the designed rotational speed 100% and designed hot gas temperature, possible efficiency drop-offs are to be taken into account. According to the increase in rotational speed, dynamic power $P_{dyn}$ is absorbed from the shafting (not shown). In addition, the spacing in the mechanical rotational speed $n_{mech}$ to a load design for an over-rotational speed is reduced.

At the time instance $T_2$ the anticipated under-frequency event begins. Due to the decoupling of the gas turbine rotational speed $n_{mech}$ and the grid frequency F, the gas turbine 12 can be operated further at the increased rotational speed $n_{mech}$. Corresponding to the decrease in the hot gas temperature $T_{hot}$ performed when the rotational speed $n_{mech}$ increases between times $T_0$ and $T_1$, now the hot gas temperature $T_{hot}$ can be increased to the full-load value for increasing the power. Consequently, the gas turbine 12 is operated at the designed hot gas temperature with increased rotational speed $n_{mech}$ and is able to output, in this example, for frequency support, a normalized power above the full-load power. In this example, this lies at nearly 101%. This can be realized without taking into account reductions in service life that are otherwise typical for frequency support.

Additional processing parameters, such as mass flows, compressor end pressure, compressor outlet temperature, cooling air temperatures, and pressures, as well as the exhaust gas parameters change in a way known to someone skilled in the art as a function of the selected driving concept.

Analogous driving concepts are conceivable for gas turbines with sequential combustion. Here, in principle there is the possibility of using the hot gas temperatures $T_{hot}$ of both combustion chambers 15, 15' for the control or to change the hot gas temperature $T_{hot}$ of only one combustion chamber 15, 15'. The combinations with other parameters is also provided here according to the driving concept and operating point.

The relationships of the effects of rotational speed $n_{mech}$ and hot-gas temperature $T_{hot}$ on the gas turbine power $P_{rel}$, as well as the dynamic profile of the control, are strongly dependent on the construction type of the gas turbine 12 and the implemented closed-loop control system 39 as well as the control parameters. For example, the effect of the hot-gas temperature $T_{hot}$ of a second combustion chamber 15' in a gas turbine 12 with sequential combustion is significantly higher than the effect of a first combustion chamber 15. Depending on the design criteria of the gas turbine 12, such as, e.g., the mechanical, aerodynamic, and cooling requirements, as well as the grid requirements, the driving concept of the gas turbine 12 can be optimized according to the shown embodiments. Here, the driving concepts are not limited to the shown examples, but instead can be combined and expanded by someone skilled in the art according to the requirements.

In order to support the electrical grid through a high dynamic power $P_{dyn}$, it can be advantageous, for example, to first change the gas turbine rotational speed $n_{mech}$ at a rotational speed slope that is higher than that of the grid frequency change. Because the permissible rotational speed range of the gas turbine 12 is limited by mechanical and aerodynamic limits, limits are naturally set for this output of dynamic power $P_{dyn}$. Before these limits are reached, the gas turbine rotational speed $n_{mech}$ must be stabilized with a sufficient safety interval. In order not to go abruptly from driving with a very high dynamic power output $P_{dyn}$ to driving without dynamic power output $P_{dyn}$, the mechanical rotational speed $n_{mech}$ can first be reduced, for example, with a high slope that is greater than that of the change in grid frequency up to a first limit that still has a relatively large margin to the design limits of the gas turbine 12. After reaching this first limit, the rotational speed $n_{mech}$ of the gas turbine 12 can be further changed with a reduced slope that is, for example, less than that of the change in grid frequency. According to this reduced slope, dynamic power $P_{dyn}$ can still be output to the electrical grid 21 until a second limit is reached. This second limit represents the minimum distance to the design limits of the gas turbine 12 that is to be maintained in order to guarantee safe operation. Because the design limits contain both mechanical limits and also aerodynamic limits, the limits can be functions of the operating conditions of the gas turbine 12, in particular, the mechanical rotational speed $n_{mech}$, the aerodynamic rotational speed, and pressures or pressure ratios.

In addition to driving with fixed slopes or ratios that change in stages with limits, the ratio between the change in the mechanical rotational speed $n_{mech}$ and the change in grid frequency can be selected as a function of the spacing of the current mechanical rotational speed $n_{mech}$ of the gas turbine 12 and the design limits. Here, the ratio goes to zero when the mechanical rotational speed $n_{mech}$ approaches the minimum spacing to the design limits of the gas turbine 12.

Once the grid frequency F has stabilized after an under-frequency or over-frequency event, due to the electrical decoupling, the gas turbine 12 can be run again at the optimum mechanical rotational speed $n_{mech}$ independent of the value of the grid frequency F. Therefore, the shafting is accelerated or delayed in a controlled way with a small slope. In particular, in the event of acceleration of the shafting, the slope is to be selected sufficiently small so that the dynamic power $P_{dyn}$ needed for the acceleration results in no significant reduction of the power output to the electrical grid 21. The slope is usually to be selected so that only a maximum of approximately 5% of the gas turbine power is used as the dynamic power $P_{dyn}$ for the acceleration. Preferably, the percentage is to be kept even smaller than 3%. In practice, a percentage less than 1% is sufficient.

LIST OF REFERENCE SYMBOLS 10, 10', 10" Power station
11, 11' Turbine shafting
12 Gas turbine
13 Compressor
14, 14a, 14b Turbine
15, 15' Combustion chamber
16 Air inlet
17, 17' Fuel supply
18 Generator
19 Shaft
20 Grid connection (frequency-coupled)
21 Electrical grid
22 Exhaust gas outlet
23 Heat recovery steam generator
24 Steam turbine
25 Water/steam cycle
26 Gearbox (mechanical)
27 Decoupling apparatus or variable electronic gearbox
28 Timer
29 Power section
30 Load
31 Controller
32 Switch (bidirectional)
33 Voltage measurement device
34 Current measurement device
35 Control line
36, . . . , 38 Signal line
39 Closed-loop control system
40, 41 Control valve
42 Adjustable compressor guide vanes
43, . . . , 47 Transducer
48 Measurement line (rotation speed)
49 Grid frequency sensor
50 Cooling air supply
51 Generator target rotation speed
G1, . . . , G6 Phase (generator)
L1, . . . , L3 Phase (load)
$T_{hot}$ Hot gas temperature at turbine inlet of the gas turbine
$P_{rel}$ relative load of the gas turbine
$n_{mech}$ normalized mechanical speed of the gas turbine
F grid frequency in Hz
$f_G$ normalized grid frequency
$P_{dyn}$ dynamic load of the gas turbine power train which is delivered to the electrical grid due to the gradient in speed
$T_0$ time instance: start raising the rotational speed of the gas turbine
$T_1$ time instance: the rotational speed of the gas turbine is raised
$T_2$ time instance: start of drop in grid frequency
$T_3$ time instance: grid frequency is dropped
$T_4$ time instance: GT is stabilized

What is claimed is:

1. Method for operating a power station having a turbine shafting, a gas turbine having a rotor and a generator having a rotor, the turbine shafting comprising the gas turbine rotor and the generator rotor that is driven directly by the gas turbine and that generates alternating current at an operating frequency, whose output is connected to an electrical grid with a given grid frequency (F), an electronic decoupling apparatus is arranged between the generator and the grid, wherein the generator is constantly connected to the grid during an over-frequency or an under-frequency event, the decoupling apparatus decouples the operating frequency from the grid frequency (F), the method comprising:
adjusting a mechanical rotational speed ($n_{mech}$) of the gas turbine in a controlled way, increasing the mechanical speed ($n_{mech}$) in the event of temporary over-frequency events in the electrical grid thereby absorbing rotational energy from the shafting of the gas turbine for frequency support or decreasing the mechanical rotation speed ($n_{mech}$) in the event of temporary under-frequency events in the electrical grid thereby releasing rotational energy from the shafting of the gas turbine for frequency support.

2. The method according to claim 1, wherein in case of an under-frequency event in the electrical grid, the mechanical rotational speed ($n_{mech}$) of the gas turbine is decreased to a greater or lesser degree than the grid frequency.

3. The method according to claim 1, wherein in the case of an over-frequency event in the electrical grid, the mechanical rotational speed ($n_{mech}$) of the gas turbine is increased to a greater or lesser degree than the grid frequency (F).

4. The method according to claim 1, wherein a gas turbine is used with an output greater than 100 MW and, the electronic decoupling apparatus is a frequency converter in the form of a matrix converter.

5. The method according to claim 1, wherein the operating frequency clearly differs from the grid frequency or a second operating frequency.

6. The method according to claim 5, wherein the grid frequency or the operating frequency equals 50 Hz or 60 Hz.

7. The method according to claim 1, wherein a gas turbine with sequential combustion is used as the gas turbine.

8. Method for operating a power station having a turbine shafting comprising a gas turbine, having an output greater than 100 MW, and a generator that is driven directly by the gas turbine and that generates alternating current at an operating frequency, whose output is connected to an electrical grid with a given grid frequency (F), an electronic decoupling apparatus is arranged between the generator and the grid, the decoupling apparatus is a frequency converter in the form of a matrix converter and decouples the operating frequency from the grid frequency (F), the method comprising:

adjusting a mechanical rotational speed ($n_{mech}$) of the gas turbine in a controlled way in the event of temporary over-frequency or under-frequency events in the electrical grid, wherein the matrix converter comprises a plurality of controllable, bidirectional switches that are arranged in an (m x n) matrix and, controlled by a controller, connect m inputs selectively to n outputs, where m is greater than n and where a first device for determining the polarity of the currents in the inputs are provided and a second device for determining the polarity of the voltages between the inputs are provided, and wherein the first and second devices are connected to the controller by signal lines.

9. The method according to claim 1, wherein the gas turbine decoupled from the grid frequency runs at an increased mechanical rotational speed, in order to be able to output, in the event of an under-frequency event, additional kinetic energy from the shaft as electrical power to the electrical grid.

10. The method according to claim 1, wherein the gas turbine decoupled from the grid frequency runs at a reduced mechanical rotational speed, in order to be able to absorb energy from the electrical grid in the event of an over-frequency event.

11. The method according to claim 1, wherein the rotational speed slope is controlled, in order to draw a given kinetic power from the shaft and to feed it as electrical power to the electrical grid .

12. The method according to claim 1, wherein a rotational speed of the shaft is controlled at a fixed ratio to changes in the grid frequency.

13. Method for operating a power station having a turbine shafting, a gas turbine having a rotor and a generator having a rotor, the turbine shafting comprising the gas turbine rotor and the generator rotor that is driven directly by the gas turbine and that generates alternating current at an operating frequency, whose output is connected to an electrical grid with a given grid frequency (F), an electronic decoupling apparatus is arranged between the generator and the grid, the decoupling apparatus decouples the operating frequency from the grid frequency (F), the method comprising:

adjusting a mechanical speed ($n_{mech}$) of the gas turbine in a controlled way in the event of temporary over-frequency or under-frequency events in the electrical grid wherein in the event of frequency changes in the electrical grid, the mechanical rotational speed ($n_{mech}$) of the gas turbine is changed up to a first limit with a first ratio to the change in the grid frequency (F), the speed is changed starting at the first limit up to a second limit with a second ratio to the change in the grid frequency (F), and the speed is kept constant starting at the second limit independent of the grid frequency (F).

14. The method according to claim 13, wherein at least one of the limits is a function of an aerodynamic rotational speed of the gas turbine.

15. The method according to claim 1, wherein the slope of the mechanical rotational speed change of the gas turbine is limited.

16. The method according to claim 1, wherein after an under-frequency or over-frequency event, the mechanical rotational speed ($n_{mech}$) of the gas turbine is driven in a controlled way with a small rotational speed slope back to an optimum operating point.

17. The method according to claim 13, wherein advance control of at least one fuel control valve is performed as a function of the slope of the mechanical rotational speed change of the gas turbine.

18. The method according to claim 1, wherein, in the event of under-frequency or over-frequency events in the electrical grid, a closed-loop control system reacts only when the changes in frequency exceed a dead zone set around the grid frequency.

19. The method according to claim 1, wherein during under-frequency or over-frequency events in the electrical grid, a closed-loop control system reacts only when the changes in frequency relative to a sliding average of the grid frequency become greater than a given dead zone.

20. The method according to claim 1, wherein during under-frequency or over-frequency events in the electrical grid, the mechanical rotational speed ($n_{mech}$) of the gas turbine is kept constant.

* * * * *